(12) United States Patent
Chang

(10) Patent No.: US 10,795,241 B2
(45) Date of Patent: Oct. 6, 2020

(54) IP CAMERA WITH HEAT-CONDUCTING ELEMENT FOR PREVENTING DEW CONDENSATION

(71) Applicant: Sercomm Corporation, Taipei (TW)

(72) Inventor: Cheng-Chung Chang, Taipei (TW)

(73) Assignee: SERCOMM CORPORATION, Taipei (TW)

( * ) Notice: Subject to any disclaimer, the term of this patent is extended or adjusted under 35 U.S.C. 154(b) by 254 days.

(21) Appl. No.: 15/951,484

(22) Filed: Apr. 12, 2018

(65) Prior Publication Data

US 2019/0056643 A1    Feb. 21, 2019

(30) Foreign Application Priority Data

Aug. 16, 2017 (CN) .......................... 2017 1 0703174

(51) Int. Cl.
| | | |
|---|---|---|
| *G03B 17/55* | (2006.01) | |
| *H04N 5/225* | (2006.01) | |
| *H05B 3/84* | (2006.01) | |
| *G02B 27/00* | (2006.01) | |

(52) U.S. Cl.
CPC ......... *G03B 17/55* (2013.01); *G02B 27/0006* (2013.01); *H04N 5/2252* (2013.01); *H04N 5/2254* (2013.01); *H05B 3/84* (2013.01)

(58) Field of Classification Search
CPC .. G03B 17/55; G02B 27/0006; H04N 5/2252; H04N 5/2254; H05B 3/84
See application file for complete search history.

(56) References Cited

U.S. PATENT DOCUMENTS

| | | | |
|---|---|---|---|
| 6,371,925 B1 | 4/2002 | Imai et al. | |
| 7,677,943 B2 | 3/2010 | Daniels et al. | |
| 9,060,676 B2 | 6/2015 | Blackhurst et al. | |
| 2006/0056049 A1 | 3/2006 | Tokiwa et al. | |
| 2008/0194915 A1 | 8/2008 | Blackhurst et al. | |
| 2010/0201794 A1 | 8/2010 | Kido | |
| 2012/0170119 A1* | 7/2012 | Chu | G03B 17/55 |
| | | | 359/512 |

(Continued)

FOREIGN PATENT DOCUMENTS

| | | |
|---|---|---|
| CN | 2760763 Y | 2/2006 |
| CN | 201311932 Y | 9/2009 |
| CN | 100576582 C | 12/2009 |

(Continued)

OTHER PUBLICATIONS

CN Office Action issued by China National Intellectual Property Administration dated Jul. 22, 2019, Application No. 201710703174.8, pp. 1-7.

*Primary Examiner* — Shawntina T Fuqua
(74) *Attorney, Agent, or Firm* — McClure, Qualey & Rodack, LLP

(57) ABSTRACT

An IP Camera includes a heat-generating element, a lens holder, a lens assembly and a heat-conducting element. The lens assembly includes a lens, a front portion and a rear portion opposite to the front portion. The front portion surrounds the lens. The lens assembly is disposed on the lens holder with the rear portion. The heat-conducting element has a thermal conductivity greater than 5 W/mK. The heat-conducting element is in contact with the heat-generating element, and a portion of the heat-conducting element surrounds the front portion.

8 Claims, 4 Drawing Sheets

(56) References Cited

U.S. PATENT DOCUMENTS

2015/0282700 A1 10/2015 Blackhurst et al.

FOREIGN PATENT DOCUMENTS

| | | | |
|---|---|---|---|
| CN | 1873528 | B | 5/2010 |
| CN | 101808569 | A | 8/2010 |
| CN | 202003121 | U | 10/2011 |
| CN | 202103756 | U | 1/2012 |
| CN | 202135216 | U | 2/2012 |
| CN | 202443230 | U | 9/2012 |
| CN | 202455464 | U | 9/2012 |
| CN | 203084404 | U | 7/2013 |
| CN | 203721764 | U | 7/2014 |
| CN | 203724114 | U | 7/2014 |
| CN | 204031291 | U | 12/2014 |
| CN | 204180157 | U | 2/2015 |
| CN | 104580853 | A | 4/2015 |
| CN | 204362158 | U | 5/2015 |
| CN | 104749856 | A | 7/2015 |
| CN | 204515320 | U | 7/2015 |
| CN | 204785604 | U | 11/2015 |
| CN | 204925589 | * | 12/2015 |
| CN | 204925589 | U | 12/2015 |
| CN | 105376465 | A | 3/2016 |
| CN | 205264686 | U | 5/2016 |
| CN | 205283679 | U | 6/2016 |
| CN | 205464829 | U | 8/2016 |
| CN | 205520088 | U | 8/2016 |
| JP | H1144577 | A | 2/1999 |
| JP | H11142251 | A | 5/1999 |
| JP | H11197117 | A | 7/1999 |
| JP | H11197119 | A | 7/1999 |
| JP | 2004268810 | A | 9/2004 |

* cited by examiner

IP CAMERA WITH HEAT-CONDUCTING ELEMENT FOR PREVENTING DEW CONDENSATION

This application claims the benefit of People's Republic of China patent application Serial No. 201710703174.8, filed Aug. 16, 2017, the disclosure of which is incorporated by reference herein in its entirety.

TECHNICAL FIELD

The disclosure relates in general to an IP Camera, and more particularly to an IP Camera having a heat-conducting element for preventing dew condensation.

BACKGROUND

Currently in the case of an IP Camera, if the housing thereof forms a closed space, a desiccant packet is usually arranged in the interior to avoid dew condensation on the lens.

However, once the housing is not sealed properly, or the seal is broken, it is possible for the environmental moisture to invade easily. Under such a condition, when the device starts to operate, the internal temperature rises and the water vapor is forced out of the desiccant packet, which may cause the humidity inside the device to rapidly increase. Meanwhile, since the temperature inside the device is not uniform, dew condensation easily takes place on the lens, and it's not easy to remove the dew. Thus, it is possible to affect the quality of the image or video recorded by the IP camera.

SUMMARY

The disclosure is directed to an IP Camera including a heat-conducting element. The heat-conducting element is configured to transfer the waste heat generated by the internal heat-generating element to the surroundings of the front portion of the lens assembly to heat up the ambient air near the front portion, thereby achieving dew prevention or dew removal.

According to one embodiment, an IP Camera is provided. The IP Camera includes a heat-generating element, a lens holder, a lens assembly and a heat-conducting element. The lens assembly includes a lens, a front portion and a rear portion opposite to the front portion. The front portion surrounds the lens. The lens assembly is disposed on the lens holder with the rear portion. The heat-conducting element has a thermal conductivity greater than 5 W/mK. The heat-conducting element is in contact with the heat-generating element, and a portion of the heat-conducting element surrounds the front portion.

Figure 1:
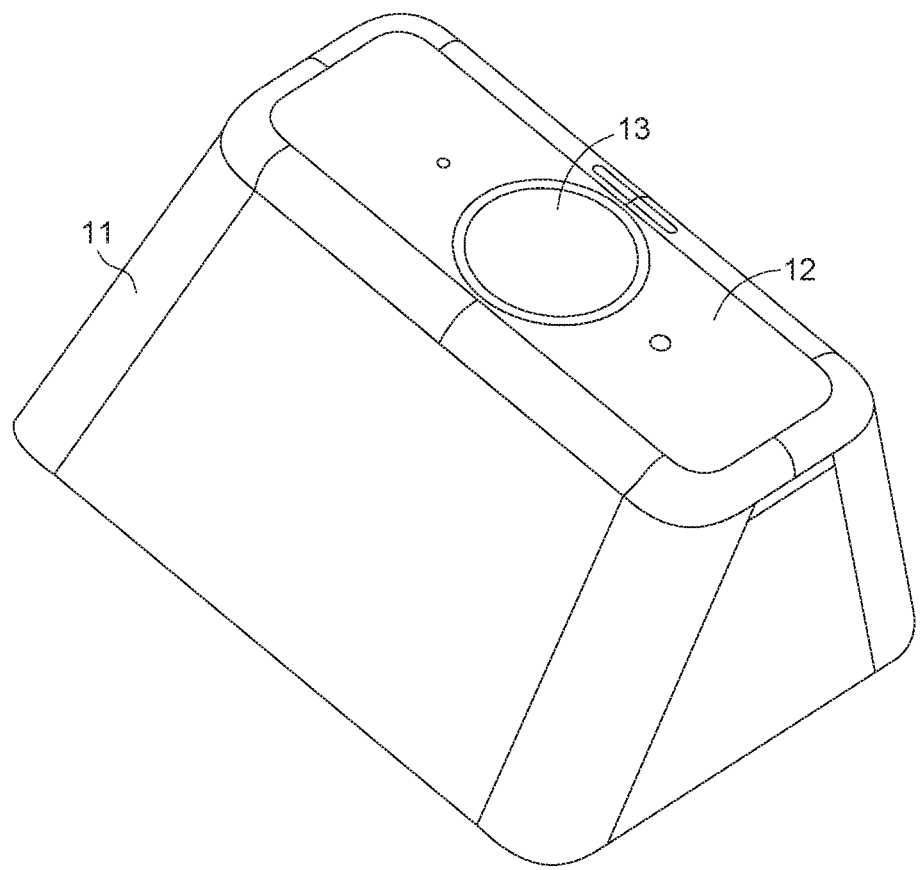
FIG. 1 illustrates a perspective view of an IP Camera according to one embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 2:
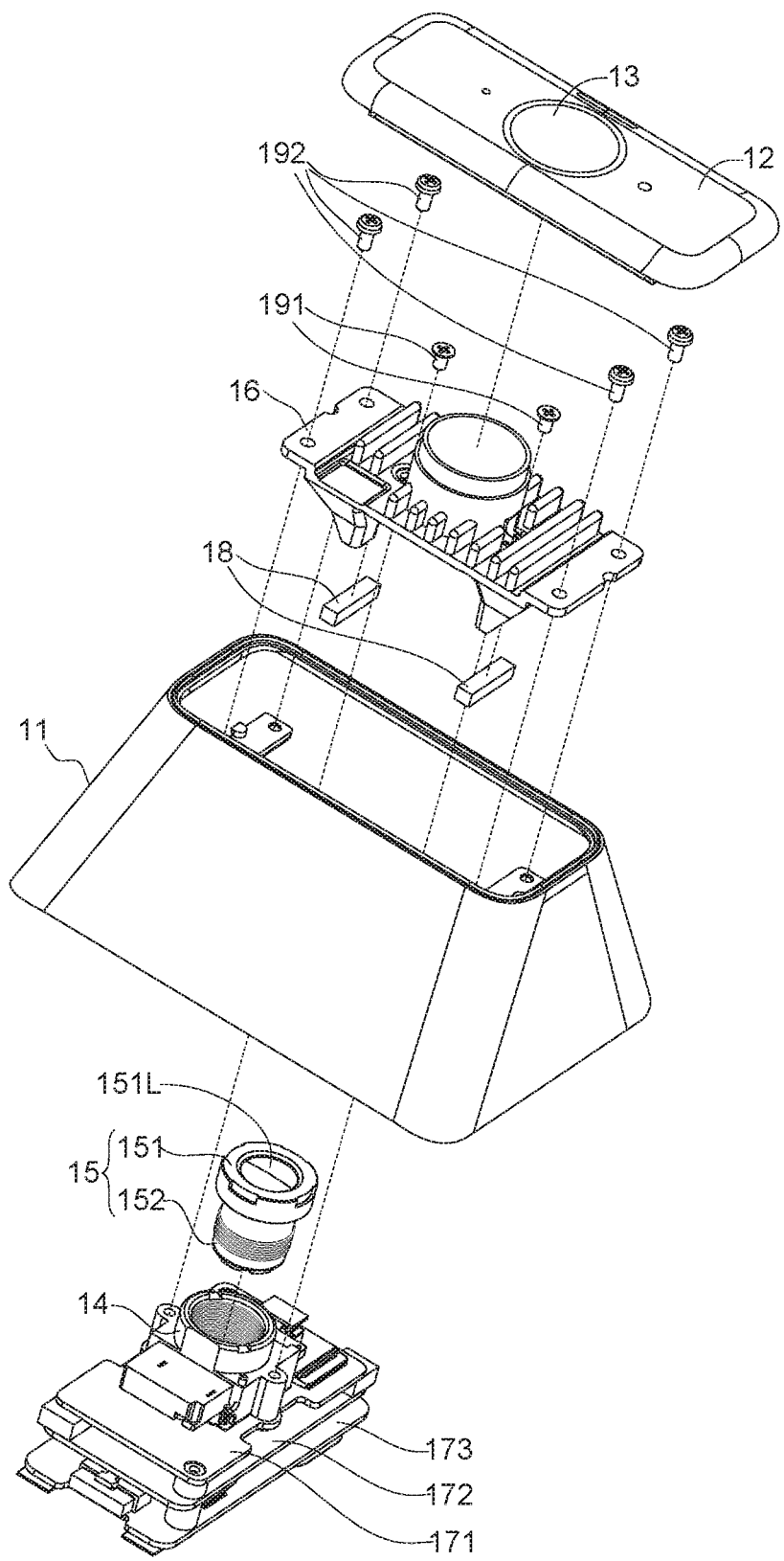
FIG. 2 illustrates a partly exploded diagram of the IP Camera of FIG. 1.

Referring to FIG. 1 and FIG. 2, FIG. 1 illustrates a perspective view of an IP Camera 1 according to one embodiment of the present disclosure, and FIG. 2 illustrates a partly exploded diagram of the IP Camera 1 of FIG. 1.

As shown in FIG. 1, the IP Camera 1 includes a housing 11, a cover 12 and a lens cover 13. The lens cover 13 is disposed on the cover 12. Referring to FIG. 2, the IP Camera 1 may include respective and independent structures inside the housing 11, such as a lens holder 14, a lens assembly 15, a heat-conducting element 16 and a heat-generating element (such as the circuit board 172).

The lens assembly 15 includes a lens 151L, a front portion 151 and a rear portion 152 opposite to the front portion 151. The front portion 151 surrounds the lens 151L. The front portion 151 is one side of the lens assembly 15 towards the outside for photographing, and the lens 151L may be disposed on the side of the front portion 151 towards the outside. The lens assembly 15 is disposed on the lens holder 14 with the rear portion 152. Here, the lens holder 14 does not surround the front portion 151 so as not to affect the assembly, alignment, focus and so on of the lens assembly 15.

The rated power of the heat-generating element may be greater than 0.5 Watt. Therefore, the heat-generating element may include the circuit element which may generate higher thermal energy as the IF Camera 1 works, such as a circuit board, a central processing unit, an image sensor, an image processor and a communication chip. Besides, the thermal pad, such as the element 18 shown in FIG. 2 and FIG. 4, and/or the heat sink in direct contact with this circuit element may be regarded as the parts of the heat-generating element. In the present embodiment, the heat-generating element includes a circuit board 172. Also, the heat-generating element may include a circuit board 171, a third circuit board 173, or other circuit elements. For example, the circuit board 171 may be an image-sensing circuit board on which an image sensor 1710 (designated in FIG. 4) is disposed correspondingly to the lens assembly 15. The circuit board 172 may be, for example, a main circuit board configured to control the operation of the IP Camera 1. The circuit board 173 may be, for example, a power supply circuit board configured to provide each element of the IP Camera 1 with required power.

In one embodiment, the circuit board 171, the circuit board 172 and the circuit board 173 may all be the elements which generate higher thermal energy as the IP Camera 1 works. Accordingly, they may each be regarded as the aforementioned heat-generating element. When the IP Camera 1 starts to operate, the thermal energy generated by the heat-generating element leads to a gradually rise in the temperature of some internal regions of the IP Camera 1. Other internal regions may be affected by low temperature of the external environment, thus resulting in excessively uneven temperature inside the IP Camera 1. Under such a condition, dew may be generated on the lens 151L on the front portion 151 of the lens assembly 15 and/or the lens cover 13. By the arrangement of the heat-conducting element 16 in the present embodiment, it is possible to effectively achieve dew prevention or dew removal and further prevent any issue caused by dew condensation. A thermal pad (not illustrated) may be attached to the cover 12. One surface of the thermal pad is in contact with the cover 12, and the other surface is in contact with the upper edge of the heat-conducting element 16, so as to enhance the efficiency of heat conduction from the heat-conducting element 16 to the lens cover 13.

Figure 3:
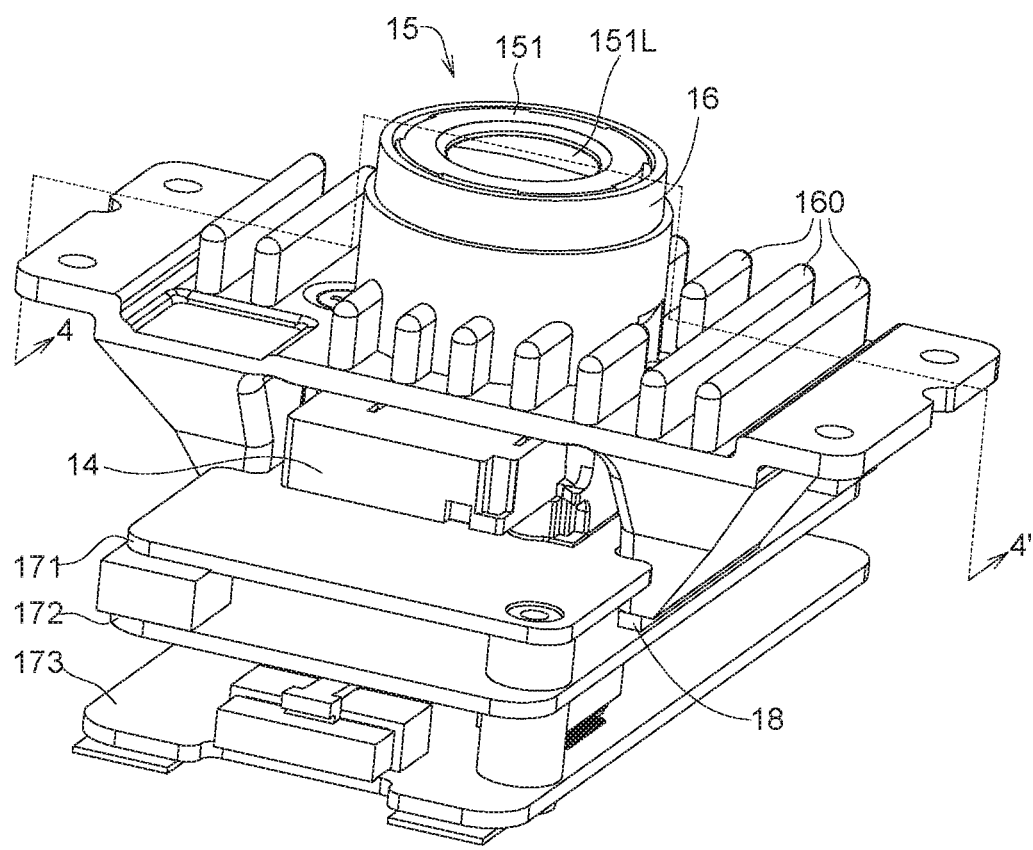
FIG. 3 illustrates a perspective view of elements inside the IP Camera of FIG. 1.
Figure 4:
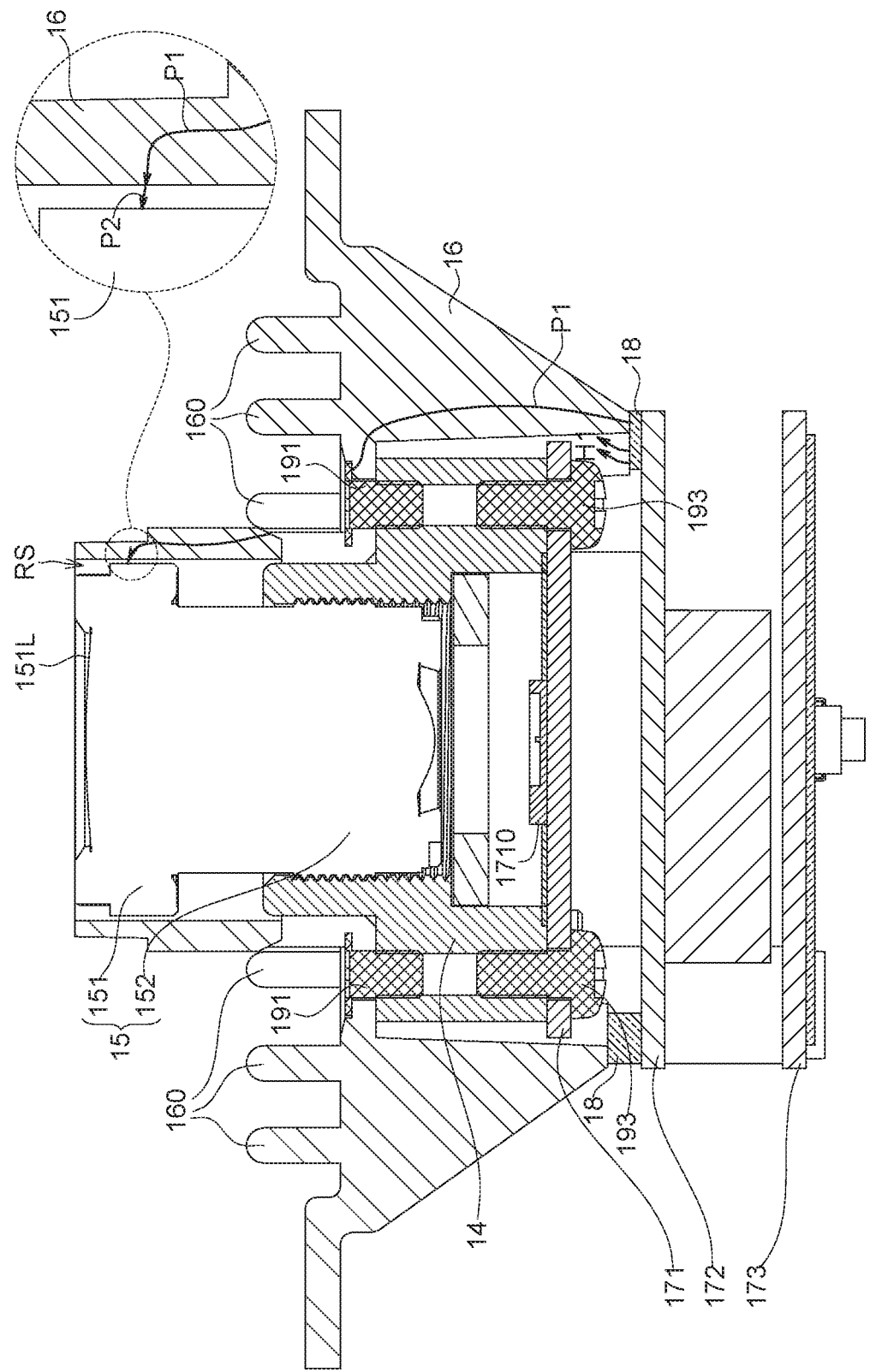
FIG. 4 illustrates a cross-sectional view along line 4-4' shown in FIG. 3.

FIG. 3 illustrates a perspective view of elements inside the IP Camera 1 of FIG. 1. FIG. 4 illustrates a cross-sectional view along line 4-4' shown in FIG. 3. Referring to FIG. 2, FIG. 3 and FIG. 4, the heat-conducting element 16 surrounds the lens assembly 15. Furthermore, a portion of the heat-conducting element 16 further extends towards the surroundings of the front portion 151 of the lens assembly 15 to surround the front portion 151. Specifically, the portion of the heat-conducting element 16 surrounding the front portion 151 may form a tube shape. That is, the portion of the heat-conducting element 16 forms a tube-shaped structure encircling the front portion 151. The lens assembly 15 is accommodated within the region surrounded by the tube-shaped portion of the heat-conducting element 16. In addition, the front portion 151 and the heat-conducting element 16 are not in contact with each other but instead have a gap in between, so as not to affect the assembly, alignment, focus and so on of the lens assembly 15. In another embodiment, the heat-conducting element 16 may only partially encircle the front portion 151. For example, the portion of the heat-conducting element 16 may form a plurality of ribs or fins surrounding the front portion 151. That is, the ribs of the portion of the heat-conducting element 16 are arranged at intervals surrounding the front portion 151. In addition, the front portion 151 and the heat-conducting element 16 are not in contact with each other but instead have a gap in between.

The heat-conducting element 16 may be made by die casting, for example. The heat-conducting element 16 has a thermal conductivity greater than 5 W/mK, preferably greater than 50 W/mK, so that the waste heat H1 generated by the heat-generating element may be quickly conducted to the surroundings of the front portion 151 through the high thermal conductivity of the heat-conducting element 16. Consequently, the temperature near the front portion 151 may rise effectively, thereby achieving dew prevention or dew removal in a short time.

More specifically, the heat-conducting element 16 may optionally be in contact with any heat-generating element (such as the circuit board 172), which may generate high thermal energy, to form a continuous heat-conducting path P1 to conduct a portion of waste heat H1 generated by the heat-generating element to the surroundings of the front portion 151 when the heat-generating element works. The term "contact" herein may refer to the way of being in direct contact with the circuit board 172 or being in direct contact with the thermal pad 18 on the circuit board 172, for example. When the heat-conducting element 16 is in contact with the thermal pad 18, one side of the thermal pad 18 is in contact with the circuit board 172, and the other side of the thermal pad 18 is in contact with the heat-conducting element 16. The thermal pad 18 may have a thermal conductivity greater than 1 W/mK, such as in a range of 1-15 W/mK. But the present disclosure is not limited thereto.

Here, the heat-conducting element 16 is not limited to be in contact with the circuit board 172. The heat-conducting element 16 may also be in contact with the circuit board 171, the circuit board 173, the heat-conducting pad 18/heat sink attached thereon, or other heat-generating elements. The heat-conducting element 16 itself may serve as a heat-conducting medium to constitute a continuous heat-conducting path P1 from the heat-generating element to the surroundings of the front portion 151. It should be noted that the heat-conducting path P1 depicted in FIG. 4 is not continuous due to the position of the line 4-4' shown in FIG. 3. However, it should be understood for a person ordinarily skilled in the art that the heat-conducting path not shown in FIG. 4 may be connected together to form a continuous heat-conducting path P1 since the heat-conducting element 16 is a homogeneous structure. Furthermore, since the heat-conducting element 16 is not in contact with the front portion 151 (that is, a gap exists between the heat-conducting element 16 and the front portion 151), after the waste heat H1 is transferred to the surroundings of the front portion 151 through thermal conduction, the waste heat H1 is further transferred from the heat-conducting element 16 to the front portion 151 through a thermal convective and thermal radiative path P2. An annular gap RS may be formed between the heat-conducting element 16 and the front portion 151, and the annular gap RS has a width less than 5 millimeters, so as to enhance the efficiency of heat transfer from the heat-conducting element 16 to the front portion 151. The width of the annular gap RS refers to the value of the inner radius of the portion of the heat-conducting element 16 surrounding the front portion 151 minus the outer radius of the front portion 151.

On the other hand, the heat-conducting element 16 may further include at least one heat-dissipating fin 160 configured to increase the surface area in contact with the ambient air. The heat-dissipating fins 160 are arranged around the lens assembly 15. Consequently, the waste heat H1 generated by the heat-generating element may not only be quickly transferred to the surroundings of the front portion 151 of the lens assembly 15 through the high thermal conductivity of the heat-conducting element 16, but also further have a thermal convection and thermal radiation with the ambient air of the front portion 151 through the heat-dissipating fins 160 thereby facilitating a rise in temperature near the front portion 151.

Referring to FIG. 2 and FIG. 4, in the present embodiment, the lens holder 14 may be secured on the first circuit board 171 via the fastening elements 193. The second circuit board 172 and the third circuit board 173 are thereafter assembled to the first circuit board 171. Afterwards, the lens assembly 15 is disposed on the lens holder 14. After the operation on the lens assembly 15, such as the assembly, alignment, and focus, is finished, the heat-conducting element 16 may be fastened to the lens holder 14 via the fastening elements 191, and the heat-conducting element 16 is in contact with the second circuit board 172 through thermal pads 18, as shown in FIG. 4. Next, as shown in FIG. 2, the heat-conducting element 16 may be fastened inside the housing 11 via the fastening elements 192. Subsequently, the cover 12 and the lens cover 13 may be disposed on the housing 11 by ultrasonic weld, for example, to cover the lens assembly 15 and the heat-conducting element 16, thus preventing contaminates such as dust from entering the housing 11. Under such a condition, the front portion 151 is not in contact with the heat-conducting element 16, the cover 12 and the lens cover 13, so as to prevent the position of the lens assembly 15 from altering and an error in focus.

Through the above design, the heat-conducting element is configured to transfer the waste heat generated by the internal heat-generating element (such as a circuit board or semiconductor chip) to the surroundings of the lens assembly, so that the temperature of the front portion may rise to achieve dew prevention or dew removal. Under such design, it may also facilitate heat dissipation and numerous other advantages. For example, in the design of the IP Camera, the surrounding temperature of the front portion may rise by about 15° C. within 30 minutes, such rise in temperature is quite remarkable. Thus, it is possible to achieve dew prevention or dew removal from the lens without using any desiccant packet. In addition, strict sealing condition is not necessary during the process, assembly, delivery, or use of the IP Camera. Moreover, it is not required to use additional heating element or waste extra power to heat up the ambient air near the front portion. Therefore, the costs may be reduced effectively.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An IP Camera comprising:
   a heat-generating element;
   a lens holder;
   a lens assembly comprising a lens, a front portion and a rear portion opposite to the front portion, the front portion surrounding the lens, the lens assembly disposed on the lens holder with the rear portion; and
   a heat-conducting element with a thermal conductivity greater than 5 W/mK, the heat-conducting element being in contact with the heat-generating element, a portion of the heat-conducting element extending towards the front portion and laterally surrounding the front portion, wherein the portion of the heat-conducting element is spaced from the front portion with an annular gap having a width less than 5 millimeters.

2. The IP Camera according to claim 1, wherein the heat-conducting element comprises at least one heat-dissipating fin arranged around the lens assembly.

3. The IP Camera according to claim 1, wherein a rated power of the heat-generating element is greater than 0.5 Watt.

4. The IP Camera according to claim 1, wherein the thermal conductivity of the heat-conducting element is greater than 50 W/mK.

5. The IP Camera according to claim 1, wherein the heat-generating element comprises a circuit element and a thermal pad with one side in contact with the circuit element and the other side in contact with the heat-conducting element.

6. The IP Camera according to claim 1, wherein the portion of the heat-conducting element surrounding the front portion forms a tube shape, or comprises a plurality of ribs or fins surrounding the front portion.

7. The IP Camera according to claim 1, wherein the heat-conducting element provides a continuous heat-conducting path with a thermal conductivity greater than 5 W/mK between the heat-generating element and the surroundings of the front portion.

8. The IP Camera according to claim 1, further comprising a cover, a lens cover and a thermal pad, wherein the lens cover is disposed on the cover, and the thermal pad is attached to the cover with one surface in contact with the cover and the other surface in contact with the heat-conducting element.

* * * * *